(12) United States Patent
Hsu et al.

(10) Patent No.: US 9,362,748 B2
(45) Date of Patent: Jun. 7, 2016

(54) POWER SYSTEM WITH COMBINATION OF ACTIVE CURRENT SHARING AND DROOP CURRENT SHARING AND POWER SYSTEM ASSEMBLY USING THE SAME

(71) Applicant: DELTA ELECTRONICS, INC., Taoyuan Hsien (TW)

(72) Inventors: Cheng-Chan Hsu, Taoyuan Hsien (TW); Chan-Chia Yeh, Taoyuan Hsien (TW); Chien-An Lai, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 726 days.

(21) Appl. No.: 13/732,978

(22) Filed: Jan. 2, 2013

(65) Prior Publication Data

US 2014/0049108 A1 Feb. 20, 2014

(30) Foreign Application Priority Data

Aug. 14, 2012 (TW) ............................... 101129325 A

(51) Int. Cl.
*H02J 3/06* (2006.01)
*H02J 3/46* (2006.01)
*H02J 3/48* (2006.01)

(52) U.S. Cl.
CPC ..... *H02J 3/06* (2013.01); *H02J 3/46* (2013.01); *H02J 3/48* (2013.01); *Y10T 307/549* (2015.04)

(58) Field of Classification Search
CPC ........... H02J 3/06; H02J 3/48; Y10T 307/549
USPC ...................................................... 307/52, 82
See application file for complete search history.

(56) References Cited

U.S. PATENT DOCUMENTS

| 4,084,103 | A | * | 4/1978 | Burns, III | H02M 3/157 307/132 EA |
| 5,200,643 | A | * | 4/1993 | Brown | G05F 1/575 307/43 |
| 6,201,723 | B1 | * | 3/2001 | Farrington | H02J 1/102 363/147 |
| 6,320,771 | B1 | * | 11/2001 | Hemena | H02J 1/102 323/272 |
| 7,782,039 | B1 | * | 8/2010 | He | H02M 3/1588 323/224 |
| 2002/0125869 | A1 | | 9/2002 | Groom et al. | |

(Continued)

FOREIGN PATENT DOCUMENTS

CN 102468685 5/2012
TW 201010251 3/2010

*Primary Examiner* — Jared Fureman
*Assistant Examiner* — Emmanuel R Dominique
(74) *Attorney, Agent, or Firm* — Kirton McConkie; Evan R. Witt

(57) ABSTRACT

A power system with a combination of active current sharing and droop current sharing is disclosed. The power system includes a system load and plural power supplies connected with each other and connected to the system load. The power supplies are configured to respectively output a load current to the system load, and each power supply includes an active current sharing circuit and a droop current sharing circuit. The active current sharing circuit is configured to enter an operation or shutdown mode depending on whether the load current is higher than a first current set point. The droop current sharing circuit is configured to enter an operation or shutdown mode depending on whether the load current is higher than a second current set point. Hence, each power supply can respectively output an equal share of the load current by an active current sharing technique and/or a droop current sharing technique.

20 Claims, 5 Drawing Sheets

(56) References Cited

U.S. PATENT DOCUMENTS

| | | | | |
|---|---|---|---|---|
| 2003/0066759 A1* | 4/2003 | Hardee | ............... | C25C 7/00 |
| | | | | 205/565 |
| 2006/0273740 A1* | 12/2006 | Saeueng | ............... | H02J 1/102 |
| | | | | 315/291 |
| 2008/0205093 A1* | 8/2008 | Davies | ............... | H02J 3/1864 |
| | | | | 363/35 |
| 2008/0290666 A1* | 11/2008 | Bourgeau | ............... | H02P 9/006 |
| | | | | 290/40 A |
| 2010/0013304 A1* | 1/2010 | Heineman | ............... | G06F 1/26 |
| | | | | 307/31 |
| 2010/0013307 A1* | 1/2010 | Heineman | ............... | G06F 1/26 |
| | | | | 307/33 |
| 2011/0068634 A1* | 3/2011 | Kammeter | ............... | H02J 1/102 |
| | | | | 307/82 |
| 2012/0026760 A1* | 2/2012 | Juhlin | ............... | H02J 3/36 |
| | | | | 363/35 |
| 2012/0056479 A1* | 3/2012 | Skinner | ............... | H02J 1/10 |
| | | | | 307/24 |
| 2012/0071043 A1* | 3/2012 | Rembach | ............... | B63H 21/21 |
| | | | | 440/6 |

* cited by examiner

POWER SYSTEM WITH COMBINATION OF ACTIVE CURRENT SHARING AND DROOP CURRENT SHARING AND POWER SYSTEM ASSEMBLY USING THE SAME

FIELD OF THE INVENTION

The invention is related to a power system, and more particularly to a power system consisted of parallel-connected power supplies with active current sharing and droop current sharing functionality and the power system assembly using the same.

BACKGROUND OF THE INVENTION

With the progress of technology, various kinds of electronic products have been developed in recent years. These electronic products are designed to satisfy people's desire and facilitate people's daily life. These electronic products are made up of a variety of electronic elements with different voltage specifications. Hence, the AC power used in the contemporary power system is not adaptable for use with the electronic products. In order to supply an appropriate voltage for all kinds of electronic elements to operate normally, these electronic products requires the AC power, such as the utility power, to be converted by a power supply into a voltage tailored for the electronic products.

With the awakening of environment protection, the developments of electronic products are following the trend of power saving. The power supplies also have to be featured with low energy consumption. In order to optimize the energy utilization and provide the load with high-reliability and high-current power, it is a popular norm to constitute a power system by connecting a multiplicity of power supplies with the same power rating or different power rating in parallel with each other.

Nowadays, some parallel-connected power supplies of the power system are provided with active current sharing circuits for allowing the current required by the load to be equally distributed among the power supplies by the active current sharing technique with precise current balancing feature. Also, some parallel-connected power supplies of the power system are provided with droop current sharing circuits for allowing the current required by the load to be equally distributed among the power supplies by the droop current sharing technique with simple circuitry, fast response, and invulnerability against oscillation.

The artisan of the power supply industry can readily understand that the active current sharing technique and the droop current sharing technique both have their own advantages. Nonetheless, the power supply employing the active current sharing technique bears the disadvantages of complicated circuitry, slow response, and vulnerability to oscillation. Although the droop current sharing technique can eliminate the disadvantages encountered by the active current sharing technique, the droop current sharing technique can't provide good current balancing effect. Thus, the user has to decide whether the parallel-connected power supplies employing the active current sharing technique or the parallel-connected power supplies employing the droop current sharing technique are to be used to constitute a power system, instead of allowing the user to flexibly adopt the parallel-connected power supplies employing the active current sharing technique and the parallel-connected power supplies employing the droop current sharing technique to constitute a power system.

Furthermore, in order to enhance the reliability of power system, the parallel-connected power supplies of the power system will install an additional redundant power supply to ensure that the redundant power supply can provide backup power for the power system to sustain operation for a period of time when one of the power supplies of the power system is operating abnormally. This technique is called N+1 system. That is, instead of requiring N power supplies to constitute a power system to power the load, the power system needs N+1 power supplies to maintain a smooth operation. However, in order to ensure that the redundant power supply can immediately provide backup power for the power system to sustain operation for a period of time when one of the power supplies of the power system is operating abnormally, the redundant power supply has to keep operating all the time. As the power supply will suffer power loss during operation, the total power loss of the power system will increase as the number of the power supplies installed in the power system is increased. In other words, the power system will suffer excessive power loss as the redundant power supply is required to operate without respite.

Therefore, there is a tendency to develop a power system consisted of parallel-connected power supplies with active current sharing and droop current sharing functionality and the power system assembly using the same. The invention can meet these needs.

THE SUMMARY OF THE INVENTION

An object of the invention is to provide a power system with active current sharing and droop current sharing functionality and the power system assembly using the same. By allowing the power supplies of the power system to incorporate an active current sharing circuit and a droop current sharing circuit that can be configured to be activated depending on practical requirements, the parallel-connected power supplies of the power system can flexibly employ the active current sharing technique, the droop current sharing technique, or the combination of both current sharing techniques to enable the parallel-connected power supplies of the power system to be provided with the functionality of power redundancy. Also, when a power supply is operating abnormally, the invention can issue an unloading signal to unload the system load. Hence, the power system can maintain a high reliability and reduce its power loss without the need of installing an additional redundant power supply.

To this end, a primary aspect of the invention is aimed at the provision of a power system, which includes a system load; and a plurality of power supplies connected in parallel with each other and connected to the system load for respectively outputting a load current to the system load. Each power supply includes an active current sharing circuit configured to enter an operation mode or a shutdown mode depending on whether the load current is higher than a first current set point, and a droop current sharing circuit configured to enter an operation mode or a shutdown mode depending on whether the load current is higher than a second current set point. Each power supply is configured to output an equal share of the load current by an active current sharing technique and/or a droop current sharing technique.

Another aspect of the invention is aimed at the provision of a power system assembly, which includes a plurality of power systems connected in series with each other. Each power system includes a system load; and a plurality of power supplies connected in parallel with each other and connected to the system load for respectively outputting a load current to the system load. Each power supply includes an active current sharing circuit configured to enter an operation mode or a shutdown mode depending on whether the load current is higher than a first current set point; and a droop current sharing circuit configured to enter an operation mode or a shutdown mode depending on whether the load current is higher than a second current set point. Each power supply is configured to output an equal share of the load current by an active current sharing technique and/or a droop current sharing technique. When one of the power systems is overloaded, the other power systems that are light-loaded or empty-loaded are configured to provide backup power to the power system that is overloaded.

A third aspect of the invention is aimed at the provision of a power system assembly, which includes a plurality of power systems each of which includes a plurality of first power supplies and a system load, wherein the first power supplies are connected in parallel with each other and connected to the system load for outputting a load current to the system load; and a power bank connected to the power systems and having a plurality of parallel-connected second power supplies for allowing the second power supplies to respectively output a load current when one of the power systems is overloaded, thereby allowing the power bank to output the load current as backup power to an overloaded power system. Each of the first power supply and each of the second power supply respectively include an active current sharing circuit and a droop current sharing circuit, and each first power supply and the active current sharing circuit of each second power supply are configured to enter an operation mode or a shutdown mode depending on whether the load current is higher than a first current set point, and each first power supply and the droop current sharing circuit of each second power supply are configured to enter an operation mode or a shutdown mode depending on whether the load current is higher than a second current set point, thereby allowing each first power supply and each second power supply to respectively output an equal share of the load current by an active current sharing technique and/or a droop current sharing technique.

Now the foregoing and other features and advantages of the invention will be best understood through the following descriptions with reference to the accompanying drawings, in which:

DESCRIPTION OF THE PREFERRED EMBODIMENT

Several exemplary embodiments embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 1:
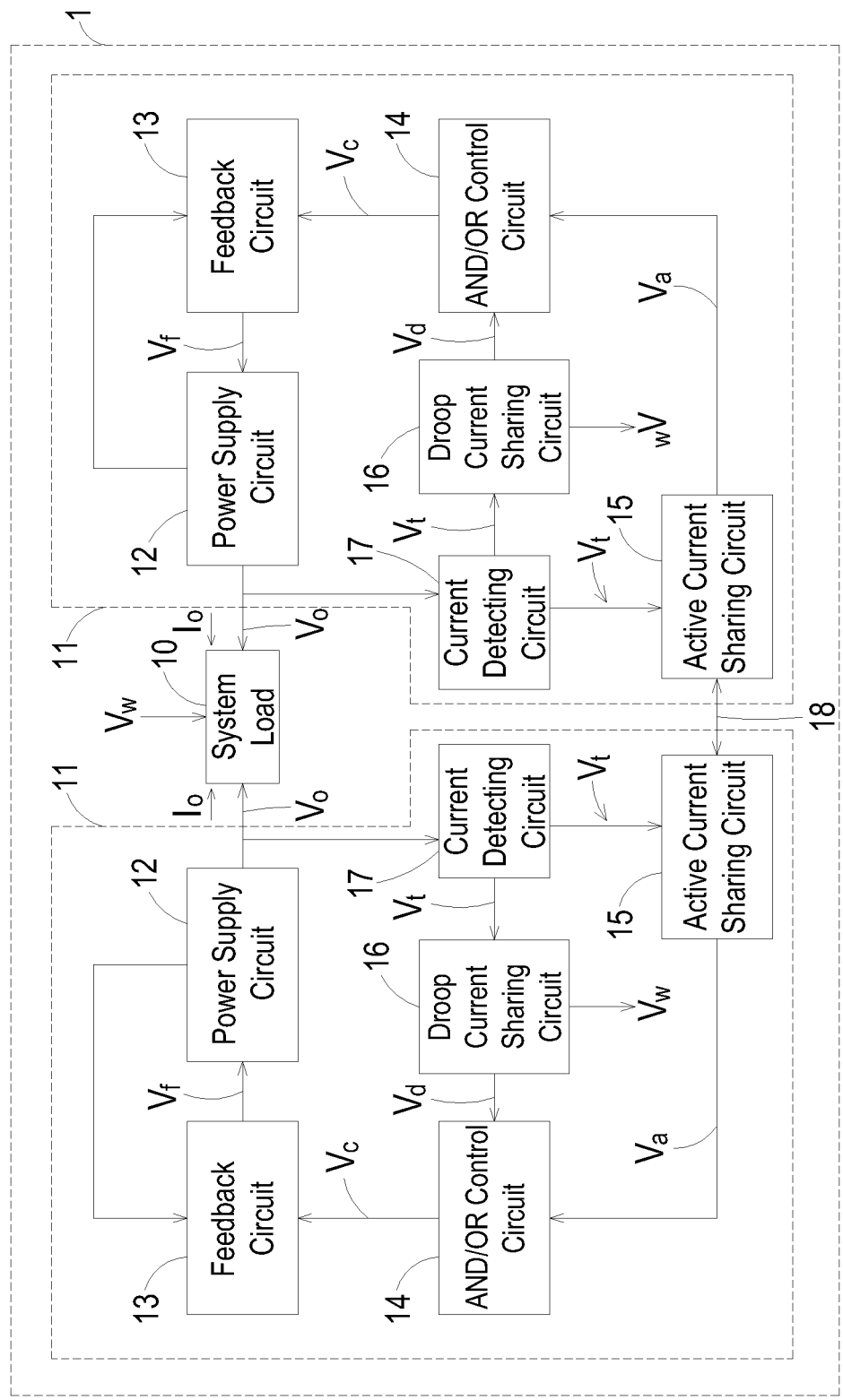
FIG. 1 shows a block diagram of a power system having an active current sharing circuit and a droop current sharing circuit according to the invention.

Referring to FIG. 1, wherein a block diagram of a power system having an active current sharing circuit and a droop current sharing circuit according to the invention is shown. As shown in FIG. 1, the power system 1 includes a system load 10 and a plurality of power supplies 11, in which the power supplies, such as the two power supplies 11 shown in FIG. 1, are connected in parallel with each other and are connected to the system load 10. The power supplies 11 are used to receive an input voltage (not shown), which can be a commercially available AC voltage, and convert the input voltage, thereby outputting a load current Io in an equally sharing manner to the system load 10 to drive the system load 10. In this embodiment, the output power of the power supplies 11 may be equal.

In this embodiment, each power supply 11 includes a power supply circuit 12, a feedback circuit 13, and AND/OR control circuit 14, an active current sharing circuit 15, a droop current sharing circuit 16, and a current detecting circuit 17. The power supply circuit 12 is connected to the system load 10 through the output end of the power supply 11, and is used to receive the input voltage and convert the input voltage by the ON/OFF operations of at least one internal switch element (not shown). Thus, a load voltage Vo and a load current Io are generated to drive the system load 10.

The feedback circuit 13 is connected to the power supply circuit 12 for outputting a feedback signal Vf to the power supply circuit 12, in order to change the duty cycle of the internal switch element of the power supply circuit 12 and adjust the voltage value of the load voltage Vo. In this embodiment, the feedback signal Vf may be subject to change with the variation of the load voltage Vo of the power supply circuit 12. Thus, the duty cycle of the internal switch element of the power supply circuit 12 can be adjusted to maintain the load voltage Vo of the power supply circuit 12 at a rated level.

The current detecting circuit 17 is connected to the power supply circuit 12 for detecting the load current Io of the power supply circuit 12, in order to output a detecting voltage Vt which is proportional to the load current Io according to the load current Io.

The active current sharing circuit 15 is connected to the output end of the current detecting circuit 17 for receiving the detecting voltage Vt from the current detecting circuit 17, in order to understand the information of the load current Io. Also, the active current sharing circuit 15 may be connected to the active current sharing circuits 15 of the other power supplies 11 through a bus 18, thereby receiving the information of the load current Io associated with the other power supplies 11 from the other active current sharing circuits 15. Moreover, the active current sharing circuit 15 has a predetermined first current set point and is able to determine if the load current Io is higher than the first current set point according to the detecting voltage Vt, thereby allowing the active current sharing circuit 15 to enter the operation mode or the shutdown mode. When the active current sharing circuit 15 enters the operation mode, the active current sharing circuit 15 outputs an active current sharing signal Va according to the information of the load current Io and the information of the load current Io outputted from other power supplies 11, thereby allowing the parallel-connected power supplies 11 of the power system 1 to respectively output an equal share of the load current Io to the system load 10 by the active current sharing technique.

The droop current sharing circuit 16 is connected to the output end of the current detecting circuit 17 for receiving the detecting voltage Vt from the current detecting circuit 17, in order to understand the information of the load current Io. Also, the droop current sharing circuit 16 has a predetermined second current set point and is able to determine if the load current Io is higher than the second current set point according to the detecting voltage Vt, thereby allowing the droop current sharing circuit 16 to enter the operation mode or the shutdown mode. When the droop current sharing circuit 16 enters the operation mode, the droop current sharing circuit 16 outputs a droop current sharing signal Vd as the current value of the load current Io increases, thereby driving the load voltage Vo of the power supply 12 to decrease. In this way, the parallel-connected power supplies 11 of the power system 1 can respectively output an equal share of the load current Io to the system load 10 by the droop current sharing technique.

The AND/OR control circuit 14 is connected to the feedback circuit 13, the active current sharing circuit 15, and the droop current sharing circuit 16 for receiving the active current sharing signal Va from the active current sharing circuit 15 and/or receiving the droop current sharing signal Vd from the droop current sharing circuit 16, in order to output a control signal Vc to the feedback circuit 13. Hence, the control signal Vc is substantially associated with the active current sharing signal Va or the droop current sharing signal Vd. Or otherwise, the control signal Vc is substantially associated with the active current sharing signal Va and the droop current sharing signal Vd. Thus, the feedback signal Vf outputted from the feedback signal 13 is subject to change with the variation of the load voltage Vo of the power supply circuit 12, and is also subject to change with the variation of the control signal Vc. In this way, the feedback signal Vf can be adjusted by the control signal Vc to change the duty cycle of the internal switch element of the power supply circuit 12 along with the feedback signal Vf. Under this condition, the power supplies 11 of the power system 1 can dynamically employ the active current sharing technique, the droop current sharing technique, or the combination of the active current sharing technique and the droop current sharing technique to respectively output an equal share of the load current Io to the system load 10.

Figure 2:
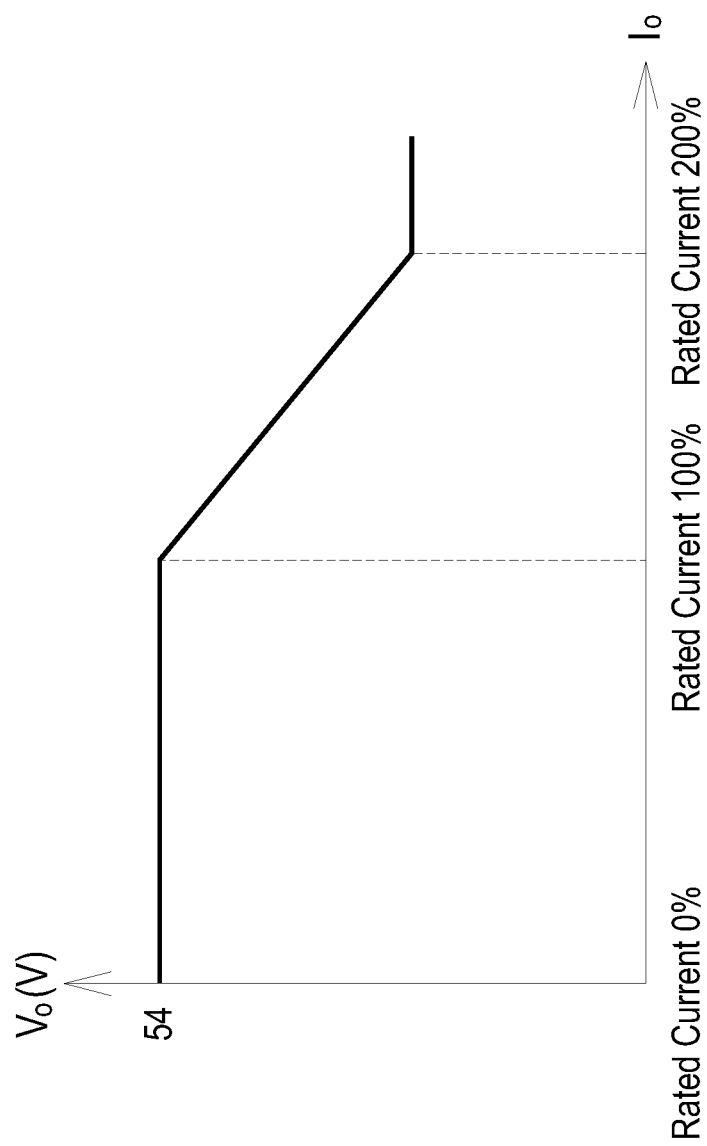
FIG. 2 is a curve diagram showing the relationship of the load voltage versus the load current of the power supply of FIG. 1.

Referring to FIG. 2 and FIG. 1, in which FIG. 2 is a curve diagram showing the relationship of the load voltage versus the load current of the power supply of FIG. 1. As shown in FIG. 1 and FIG. 2, in this embodiment the first current set point may be set to be 0% of the rated current of the power supply 11, and the second current set point may be set to be 100% of the rated current of the power supply 11, i.e. the current value of the load current Io when the power supply is under a full load state. Also, when the active current sharing circuit 15 of each power supply understands that the load current Io is lower than the first current set point according to the detecting voltage Vt, i.e. the load current Io outputted from the power supply 11 is lower than 0% of the rated current of the power supply 11, the active current sharing circuit 15 enters the shutdown mode. On the contrary, when the active current sharing circuit 15 understands that the load current Io outputted from the power supply 11 is higher than the first current set point according to the detecting voltage Vt, i.e. the load current Io outputted from the power supply 11 is higher than 0% of the rated current of the power supply 11, the active current sharing circuit 15 enters the operation mode. Hence, when the power supply 11 in this embodiment has started operating, the active current sharing circuit 15 keeps operating under the operation mode. Furthermore, when the droop current sharing circuit 16 of each power supply understands that the load current Io is lower than the second current set point according to the detecting voltage Vt, i.e. the load current Io outputted from the power supply 11 is lower than 100% of the rated current of the power supply 11, the droop current sharing circuit 16 enters the shutdown mode. On the contrary, when the droop current sharing circuit 16 understands that the load current Io outputted from the power supply 11 is higher than the second current set point according to the detecting voltage Vt, i.e. the load current Io outputted from the power supply 11 is higher than 100% of the rated current of the power supply 11, the droop current sharing circuit 16 enters the operation mode.

It can be understood from the above descriptions that when the power system in this embodiment has not started operating, the load currents Io outputted from the power supplies 11 are all lower than 0% of the rated current of the power supply, i.e. the load currents Io outputted from the power supplies 11 are all lower than the first current set point and the second current set point. Under this condition, the active current sharing circuit 15 and the droop current sharing circuit 16 both enter the shutdown mode and cease operating.

When the power system 1 has started operating and the power supplies 11 are normal, the droop current sharing circuit 16 will be kept operating under the shutdown mode and the active current sharing circuit 15 will be shifted to operate under the operation mode if the load current Io outputted from each power supply 11 is higher than 0% of the rated current of the power supply 11 but is lower than 100% of the rated current of the power supply. Under this condition, the active current sharing circuit 15 outputs an active current sharing signal Va to the AND/OR control circuit 14 to enable the AND/OR control circuit 14 to output the control signal Vc to the feedback circuit 13 in response to the active current sharing signal Va. Thus, the feedback signal Vf outputted from the feedback circuit 13 will be adjusted according to the control signal Vc. Therefore, the power supplies 11 will respectively output an equal share of the load current Io to the system load 10 by the active current sharing technique.

However, when anyone of the power supplies 11 is abnormal as a result of aging, difference of output impedance, or malfunction, the power supplies 11 can't respectively output an equal share of power to the system load 10. In order to compulsorily output the same power to the system load 10, the load current of the abnormal power supply will increase. If the load current Io is higher than 100% of the rated current of the power supply 11, i.e. when the power supply 11 is under an overload state, the active current sharing circuit 15 will be kept operating under the operation mode and the droop current sharing circuit 16 will also enter the operation mode as the load current Io is higher than the second current set point. Under this condition, the droop current sharing signal Vd is outputted to the AND/OR control circuit 14 to enable the AND/OR control circuit 14 to output the control signal Vc to the feedback circuit 13 in response to the active current sharing signal Va and the droop current sharing signal Vd. Thus, the feedback signal Vf outputted from the feedback circuit 13 can be adjusted along with the variations of the control signal Vc, thereby driving the output voltage Vo of the abnormal power supply 11 to decrease and driving the normal power supplies to output relatively high load current Io to the system load 10 within a predetermined time period. Therefore, the objective of current sharing is attained. Hence, the power supplies 11 can respectively output an equal share of the load current Io to the system load 10 by the active current sharing technique as well as the droop current sharing technique.

It can be understood from the above descriptions that when the load current outputted from each power supply 11 is higher than 0% of the rated current of the power supply but is lower than 100% of the rated current of the power supply, the active current sharing circuit 15 of each power supply will be started first to equally distribute the load current outputted to the system load 10 among the power supplies 11. Under this condition, the power supplies 11 can offer better current sharing effects by the active current sharing technique. Nonetheless, if anyone of the power supplies 11 is abnormal and is under an overload state, a load current Io which is higher than 100% of the rated current is generated. Under this condition, the droop current sharing circuit 16 of the abnormal power supplies will be started to lower the output voltage Vo of the power supply 11, thereby allowing other power supplies 11 to output a relatively high load current Io and collectively respond to the requirement of the system load 10. That is, the power supplies 11 can achieve the goal of current sharing by the active current sharing technique as well as the droop current sharing technique under this condition. As the droop current sharing technique which has the advantages of fast response and invulnerability to oscillation is employed, the normal power supplies can output a relatively high load current Io to the system load in case of an abnormal power supply. That is to say, a current sharing effect is maintained within a predetermined time period to supply the load current Io required by the system load. In this way, the power supplies are provided with the functionality of power redundancy. Therefore, the power system 1 does not need to additionally incorporate a redundant power supply, and thus the power loss is reduced.

In alternative embodiment, when the power supply 11 is abnormal and is under an overload state, that is, when the power supply 11 is outputting a current exceeding 100% of the rated output current, as shown in FIG. 1, a load current Io exceeding the second current set point is outputted to the system load 10. Under this condition, the droop current sharing circuit 16 enters the operation mode and outputs an unloading signal Vw to the system load 10 upon start-up. Thus, the system load 10 is notified to perform the unloading operation within a predetermined time period to maintain the essential operating power of the power supplies 11. In this way, the reliability of the power system 1 is enhanced.

Figure 3:
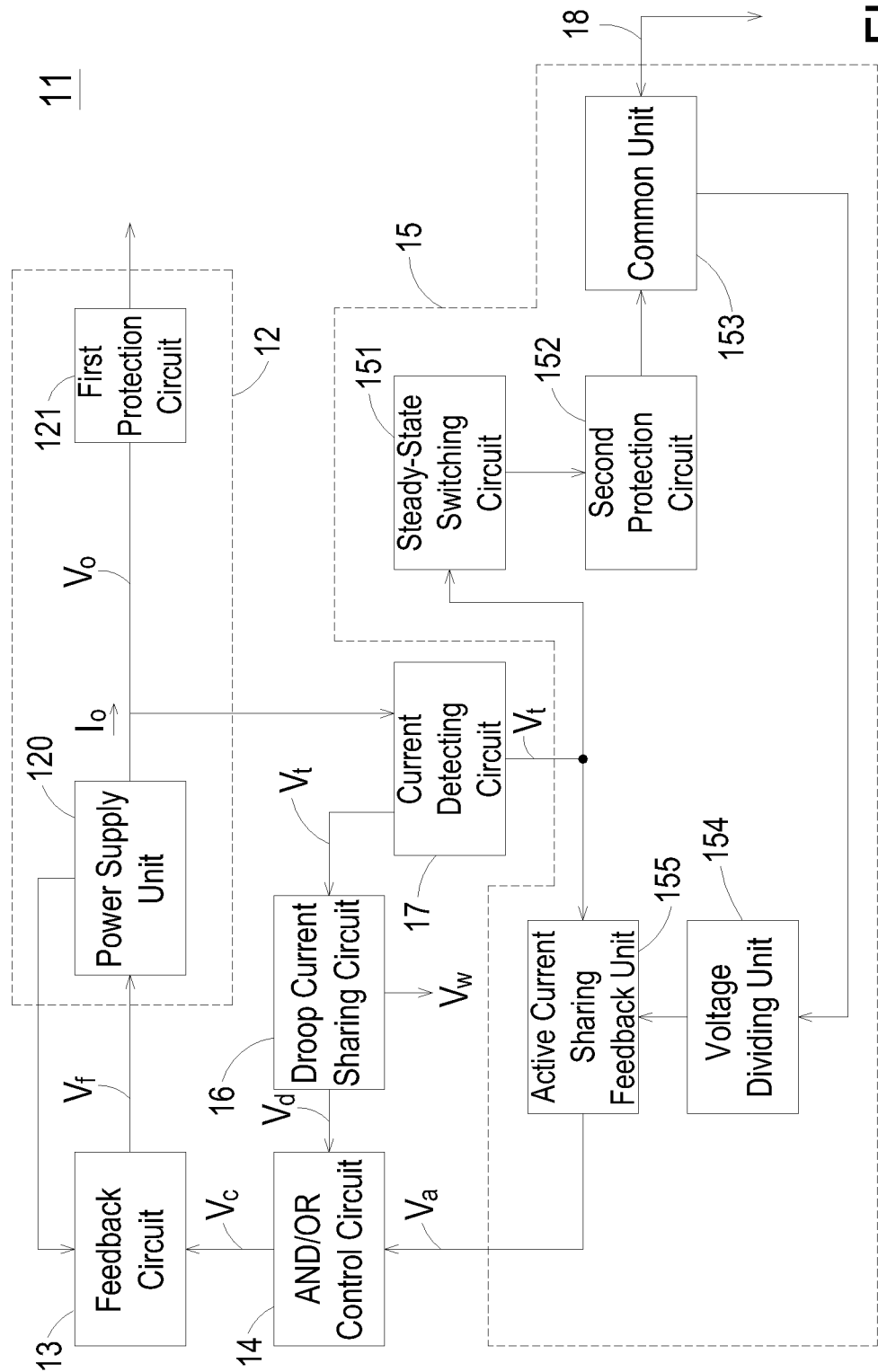
FIG. 3 shows the detailed circuitry of a single power supply of FIG. 1.

Referring to FIG. 3 and FIG. 1, in which FIG. 3 shows the detailed circuitry of a single power supply of FIG. 1. In this embodiment, the power supply circuit 12 includes a power supply unit 120 and a first protection circuit 121, in which the power supply unit 120 is connected to the first protection circuit 121 for converting an input voltage into an load voltage Vo and a load current Io. The first protection circuit 121 is connected to the output end of the power supply 11 and connected to the system load 10 through the output end of the power supply, as shown in FIG. 1. Also, the first protection circuit 121 may be made up of diodes that can transmit the load voltage Vo and the load current Io outputted from the power supply unit 120 to the output end of the power supply 11 and prevent reverse currents from flowing from the output end of the power supply 11 to the interior of the power supply 11.

The active current sharing circuit 15 includes a steady-state switching circuit 151, a second protection circuit 152, a common unit 153, a voltage dividing unit 154, and an active current sharing feedback unit 155. The steady-state switching circuit 151 is connected to the second protection circuit 152, and connected to the output end of the current detecting circuit 17 for receiving the detecting voltage Vt. The steady-state switching circuit 151 is configured to turn on and off according to the determination that the power supply 11 is operating under a steady state. When the power supply 11 is not operating under a steady state, the steady-state switching circuit 151 is turned off. On the contrary, when the power supply 11 is operating under a steady state, the steady-state switching circuit 151 is turned on. In this way, the detecting voltage Vt can be transmitted to the second protection circuit 152 through the steady-state switching circuit 151 that is turned on. The second protection circuit 152 is connected to the common unit 153 and may be made up of a super diode. The second protection circuit 152 can transmit the detecting voltage Vt to the common unit 153 and prevent reverse currents from flowing from the common unit 153 to the interior of the power supply 11. The common unit 153 is connected to the bus 18 and the voltage dividing unit 154 for transmitting the detecting voltage Vt to the common unit 153 of other power supplies 11 through the bus 18. Also, the common unit 153 can receive other detecting voltages Vt from other power supplies 11 that is indicative of the load current Io of other power supplies 11, and transmit other detecting voltages Vt to the voltage dividing unit 154. The voltage dividing unit 154 is connected to the active current sharing feedback unit 155 for dividing the detecting voltages Vt transmitted from the common unit 153. The active current sharing feedback unit 155 is connected to the current detecting circuit 17 for outputting an active current sharing signal Va according to the detecting voltage Vt transmitted from the current detecting circuit 17 and the divided detecting voltage transmitted from the voltage dividing unit 154.

Figure 4:
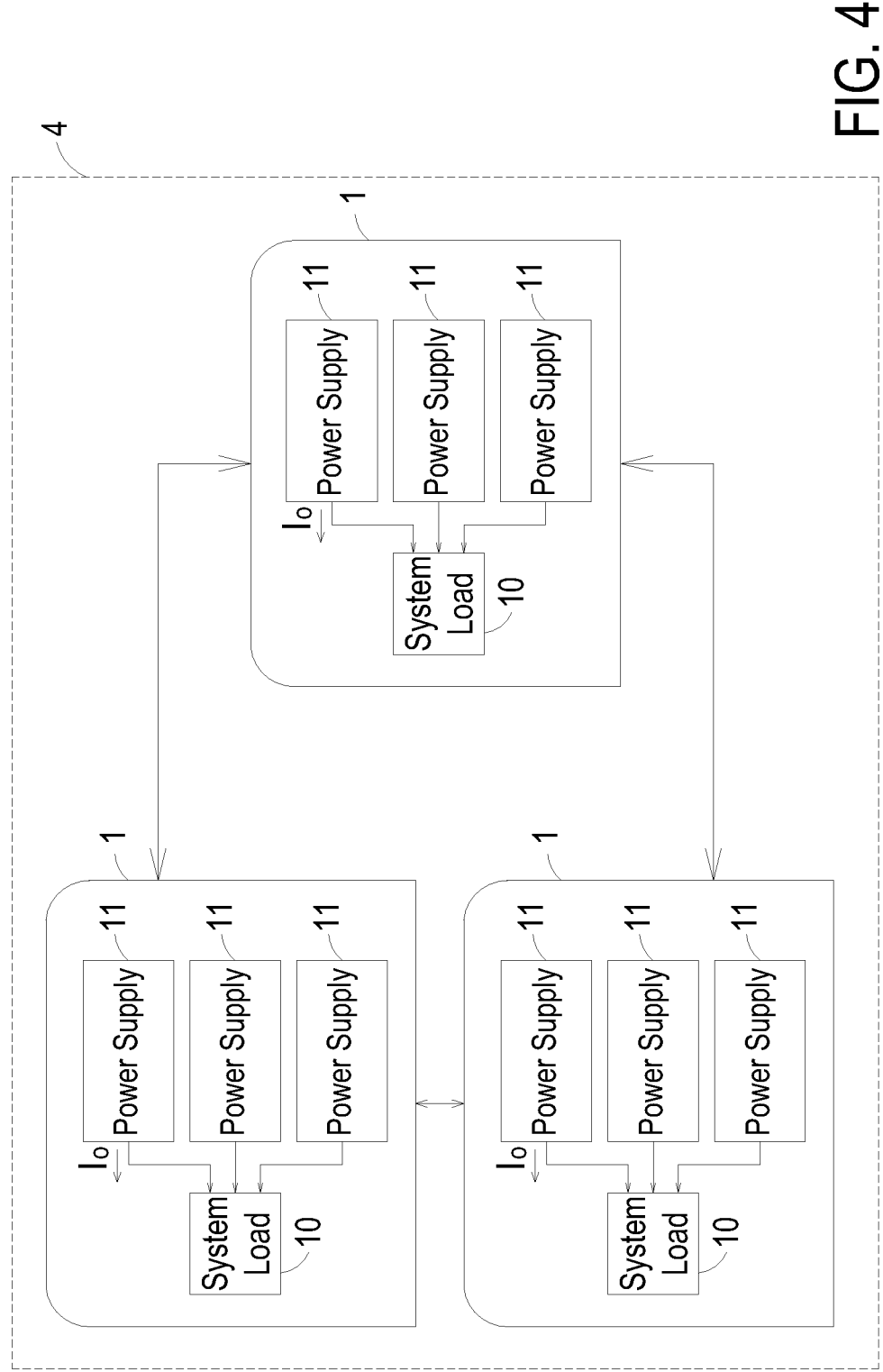
FIG. 4 shows the circuit architecture of the power system assembly consisted of the power system of FIG. 1.

Referring to FIG. 4, which shows the circuit architecture of the power system assembly consisted of the power system of FIG. 1. As shown in FIG. 4, the power system assembly 4 includes a plurality of power systems 1 of FIG. 1 (e.g. 3 power systems shown in FIG. 4) connected in series with each other. Moreover, the power systems 1 may have electric cables (not shown) that allow the power systems 1 to transmit and receive power by the interconnections of the electric cables. In this embodiment, the internal circuitry of each power system 1 is analogous to the power system 1 of FIG. 1. Hence, similar circuits are labeled with the same reference numeral to indicate that they have the same circuitry and operations. Also, the operation of the active current sharing circuit (not shown in this figure) of the power supply within each power system 1 is analogous to the operation of the circuitry of FIG. 1 and FIG. 2. That is, when the load current Io of each power supply 11 is higher than 0% of the rated current but is lower than 100% of the rated current, the power supplies 11 activate the active current sharing circuit 15 to achieve current balance by active current sharing technique. When anyone of the power supplies 11 is overloaded and thus the load current Io is higher than 100% of the rated current, the power supplies 11 activate the droop current sharing circuit 16 to achieve current balance by active current sharing technique and droop current sharing technique.

In this embodiment, each power system 1 can be used to power the internal system loads 10. Also, each power system 1 can communicate with each other to understand the status of the other power system. If the load requirement of the system load 10 of the power system is increased and thus the power system 1 is overloaded, the power supplies 11 in the power system 1 that is under a no-load state or a light-load state can immediately output a relatively large load current Io to provide extra power to the power system 1, thereby alleviating the power system 1 that is under a heavy-load state. In this way, the lifetime of the power system 1 is prolonged, and the reliability of the power system 1 is enhanced. In this embodiment, each power system 1 can transmit power directly through electric cables to neighboring power systems 1. Alternatively, each power system 1 can transmit power indirectly through the electric cables of the other power systems 1 to non-neighboring power systems 1. For example, when a certain power system 1 is connected between two power systems 1, the two power systems 1 can transmit power to the other through the electric cable of the power system interposed therebetween.

Figure 5:
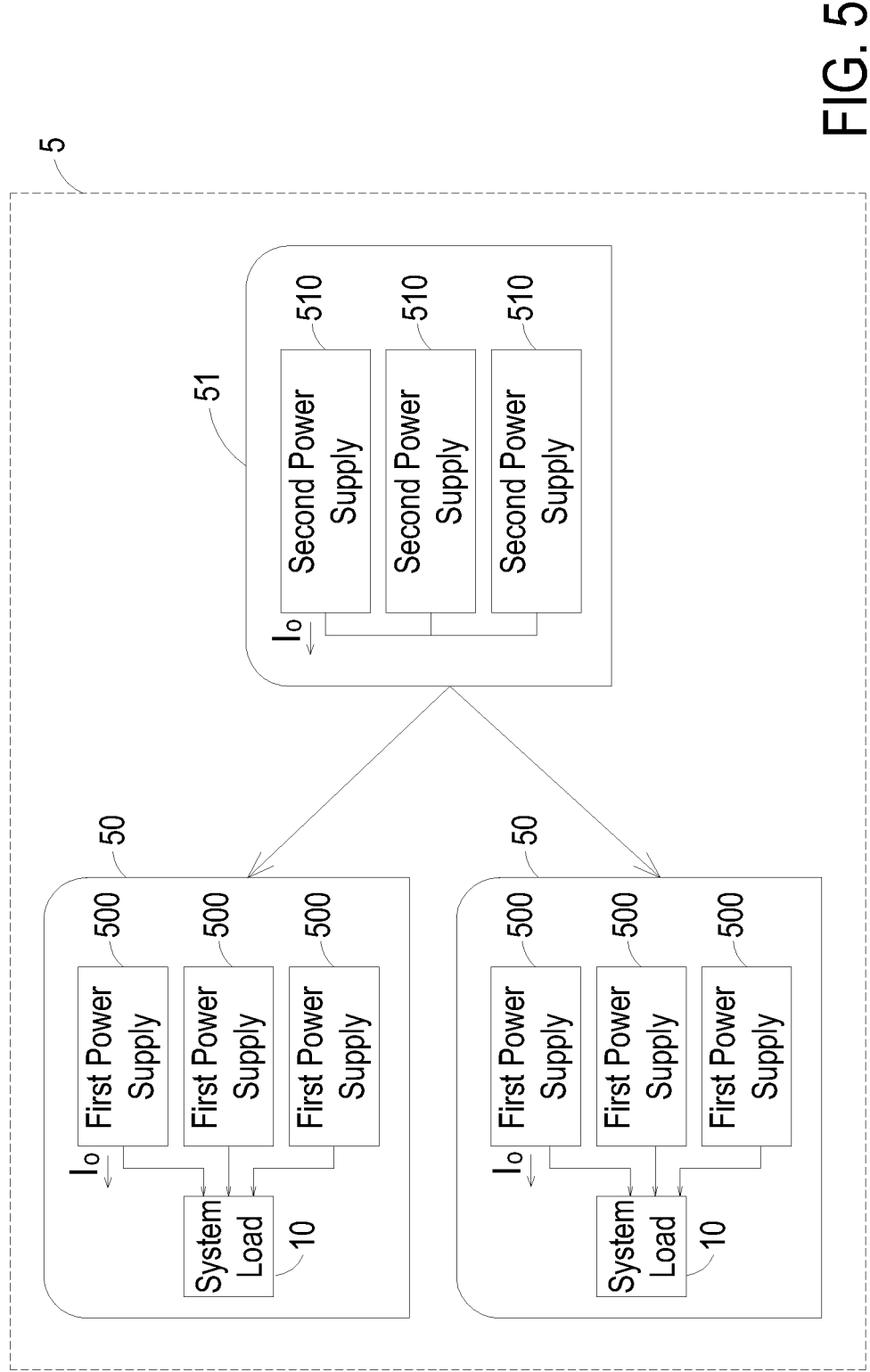
FIG. 5 shows the circuit architecture of the power system assembly according to another embodiment of the invention.

Next, the topology and operation of the power system assembly according to another embodiment of the invention will be described with reference to FIG. 5. Each first power supply and each second power supply of the power system assembly shown in FIG. 5 have similar topology as the power supply 11 shown in FIG. 3. Hence, the internal structure of the first power supply and the internal structure of the second power supply will not be illustrated in FIG. 5. Nonetheless, in order to clearly describe the technique used by the power supply assembly of FIG. 5, the internal circuitry of the first power supply and the internal circuitry of the second power supply of the power supply assembly shown in FIG. 5 will be described with reference to the circuitry of FIG. 3, in which the same element shown in FIG. 3 and FIG. 5 is labeled with similar term and reference numeral. Referring to FIG. 5 and FIG. 3, wherein FIG. 5 shows the circuitry of the power system assembly according to another embodiment of the invention. As shown in FIG. 5, the power system assembly 5 includes a plurality of power systems 50 and a power bank 51. Each power system 50 includes a plurality of parallel-connected first power supplies 500 and a system load 10. The first power supplies 500 are used to receive an input voltage and convert the input voltage, thereby outputting a load current (a first load current) Io to the system load 10 in an equally sharing manner to drive the system load 10.

The power bank 51 is connected to the power systems 50 and includes a plurality of parallel-connected second power supplies 510. The power bank 51 is used to communicate with the power systems 50 and is provided with the capability of power redundancy. That is, when the system load 10 of one of the power systems 50 increases its load requirement as a result of the abnormality of the power system 50, for example, and thus the power system 50 is under an overload state, the second power supplies 510 will output a load current (a second load current) Io as the backup power, such that the power bank 51 can provide the backup power for the power system 50 that is under an overload state. This can satisfy the requirement of the system load 10 of the power system 50 that is under an overload state.

In this embodiment, the topology of each first power supply 500 of each power system 50 and the operation of a portion of the first power supply 500 are similar to the topology of the power supply 11 and the operation of the power supply shown in FIG. 3. Hence, it is not intended to give details about the topology of each first power supply 500 of each power system 50 and the operation of a portion of the first power supply 500 herein.

In this embodiment, the first current set point of the active current sharing circuit 15 of each first power supply 500 are all set to be 0% of the rated current of the first power supply 500. However, the active current sharing circuit 15 is configured to enter the shutdown mode if the load current Io is higher than the first current set point according to the detecting voltage Vt. Also, the second current set point of the droop current sharing circuit 16 of the first power supply 500 is set to be 0% of the rated current of the first power supply 500. However, the droop current sharing circuit 16 is configured to enter the operation mode if the load current Io is higher than the second current set point according to the detecting voltage Vt. It can be understood from the above descriptions that when each power system 50 has started operating, each first power supply 500 of the power system 50 outputs a load current that is surely higher than 0% of the rated current of the first power supply 500. Hence, the active current sharing circuit 15 of each first power supply 500 enters the shutdown mode and ceases operating, while the droop current sharing circuit 16 enters the operation mode and continues operating. Therefore, when the power system 5 has started operating, the parallel-connected first power supplies 500 of the power system 5 will respectively output an equal share of the load current Io to the system load 10 by the droop current sharing technique.

The second power supplies 510 of the power bank 51 are configured to receive an input voltage and convert the input voltage, thereby outputting a load current as a backup power with an equally sharing manner. The circuitry and the operation of a portion of the each second power supply 510 are similar to the circuitry and the operation of the power supply 11 of FIG. 3, and thus it is not intended to give details herein.

In this embodiment, the first current set point of the active current sharing circuit 15 of each second power supply 510 are all set to be 0% of the rated current of the second power supply 510. However, the active current sharing circuit 15 is configured to enter the operation mode if the load current Io is higher than the first current set point according to the detecting voltage Vt. Also, the second current set point of the droop current sharing circuit 16 of the second power supply 510 is set to be 0% of the rated current of the second power supply 510. However, the droop current sharing circuit 16 is configured to enter the shutdown mode if the load current Io is higher than the second current set point according to the detecting voltage Vt. It can be understood from the above descriptions that when the power bank 51 has started operating, each second power supply 510 of the power bank 51 outputs a load current that is surely higher than 0% of the rated current of the second power supply 510. Hence, the active current sharing circuit 15 of each second power supply 510 enters the operation mode and continues operating, while the droop current sharing circuit 16 enters the shutdown mode and ceases operating. Therefore, when the power bank 51 is required to provide backup power to an overloaded power system, the parallel-connected second power supply 510 of the power bank 51 will output a load current Io as a backup power with an equally sharing manner.

In short, the power bank 51 is capable of providing backup power for an overloaded power system. Moreover, the power bank 51 is capable of providing normal power for power system assembly 5 when the power systems 50 are fully-loaded. Therefore, the power system assembly 5 can promote its overall output power by the power bank 51. For example, when the power system assembly 5 includes two power systems 50 and each power system 50 is capable of providing an output power of 100 W, the power bank 51 will provide an output power of 200 W if the power bank 51 is required to provide backup power for both power systems 50. As the power bank 51 is capable of providing normal power for the power system assembly 5 when the power systems 50 are fully-loaded, the power bank 51 is capable of providing a total output power of 400 W. Hence, the applications of the power system assembly are extended.

In conclusion, the invention provides a power system with active current sharing and droop current sharing functionality and the power system assembly using the same. By allowing the power supplies of the power system to incorporate an active current sharing circuit and a droop current sharing circuit that can be configured to be activated depending on practical requirements, the parallel-connected power supplies of the power system can flexibly employ the active current sharing technique, the droop current sharing technique, or the combination of both current sharing techniques to enable the parallel-connected power supplies of the power system to be provided with the functionality of power redundancy. Also, when a power supply is operating abnormally, the invention can issue an unloading signal to unload the system load. Hence, the power system can maintain a high reliability and reduce its power loss without the need of installing an additional redundant power supply.

While the invention has been described in terms of what are presently considered to be the most practical and preferred embodiments, it is to be understood that the invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A power system comprising:
a system load; and
a plurality of power supplies connected in parallel with each other and connected to the system load for respectively outputting a load current to the system load, wherein each power supply comprising:
an active current sharing circuit configured to enter an operation mode or a shutdown mode depending on whether the load current is higher than a first current set point; and
a droop current sharing circuit configured to enter an operation mode or a shutdown mode depending on whether the load current is higher than a second current set point;
wherein each power supply is configured to output an equal share of the load current by an active current sharing technique and a droop current sharing technique;
wherein the second current set point is higher than the first current set point.

2. The power system according to claim 1 wherein the first current set point is set to be 0% of a rated current of the power supply.

3. The power system according to claim 2 wherein when the load current is lower than the first current set point, the active current sharing circuit enters the shutdown mode, and when the load current is higher than the first current set point, the active current sharing circuit enters the operation mode, thereby allowing the power supplies to respectively output an equal share of the load current by an active current sharing technique.

4. The power system according to claim 3 wherein the first current set point is set to be 100% of the rated current of the power supply.

5. The power system according to claim 4 wherein when the load current is lower than the second current set point, the droop current sharing circuit enters the shutdown mode, and when the load current is higher than the second current set point, the droop current sharing circuit enters the operation mode, thereby allowing the power supplies to respectively output an equal share of the load current by an active current sharing technique as well as a droop current sharing technique.

6. The power system according to claim 5 wherein when the droop current sharing circuit enters the operation mode, the droop current sharing circuit issues an unloading signal to the system load to notify the power system to unload the system load within a predetermined time period.

7. The power system according to claim 1 wherein each power supply includes:
a power supply circuit connected to the system load for outputting a load voltage and the load current; and
a feedback circuit connected to the power supply circuit for outputting a feedback signal to the power supply circuit according to the load voltage outputted from the power supply circuit, thereby allowing the load voltage to be adjusted and maintained at a rate level according to the feedback signal.

8. The power system according to claim 7 wherein each power supply further includes a current detecting circuit connected to the active current sharing circuit and the droop current sharing circuit for generating a detecting voltage according to the load current to allow the active current sharing circuit and the droop current sharing circuit to understand information of the load current by the detecting voltage.

9. The power system according to claim 8 wherein the active current sharing circuit of each power supply further includes a steady-state switching circuit connected to the current detecting circuit for being turned on and off depending on whether the power supply is operating in a steady state, and allowing the detecting voltage to be transmitted to other power supplies therethrough when the power supply is operating in a steady state.

10. The power system according to claim 8 wherein each power supply further includes an AND/OR control circuit connected to the feedback circuit, the active current sharing circuit, and the droop current sharing circuit for outputting a control signal to the feedback circuit according to an active current sharing signal transmitted from the active current sharing circuit operating under the operation mode and/or a droop current sharing signal transmitted from the droop current sharing circuit operating under the operation mode, thereby allowing the feedback signal to be changed according to the control signal to drive each power supply to output an equal share of the load current by an active current sharing technique and/or a droop current sharing technique.

11. The power system according to claim 1 wherein the first current set point is preset in the active current sharing circuit and the second current set point is preset in the droop current sharing circuit.

12. A power system assembly comprising:
a plurality of power systems connected in series with each other, wherein each power system comprising:
a system load; and
a plurality of power supplies connected in parallel with each other and connected to the system load for respectively outputting a load current to the system load, wherein each power supply comprising:
an active current sharing circuit configured to enter an operation mode or a shutdown mode depending on whether the load current is higher than a first current set point; and
a droop current sharing circuit configured to enter an operation mode or a shutdown mode depending on whether the load current is higher than a second current set point;
wherein each power supply is configured to output an equal share of the load current by an active current sharing technique and a droop current sharing technique;
wherein the second current set point is higher than the first current set point;
wherein when one of the power systems is overloaded, the other power systems that are light-loaded or empty-loaded are configured to provide backup power to the power system that is overloaded.

13. The power system assembly according to claim 12 wherein the first current set point is set to be 0% of a rated current of the power supply.

14. The power system assembly according to claim 13 wherein when the load current is lower than the first current set point, the active current sharing circuit enters the shutdown mode, and when the load current is higher than the first current set point, the active current sharing circuit enters the operation mode, thereby allowing the power supplies to respectively output an equal share of the load current by an active current sharing technique.

15. The power system assembly according to claim 14 wherein the second current set point is set to be 100% of the rated current of the power supply.

16. The power system assembly according to claim 15 wherein when the load current is lower than the second current set point, the droop current sharing circuit enters the shutdown mode, and when the load current is higher than the second current set point, the droop current sharing circuit enters the operation mode, thereby allowing the power supplies to respectively output an equal share of the load current by an active current sharing technique as well as a droop current sharing technique.

17. A power system assembly comprising:
a plurality of power systems each of which includes a plurality of first power supplies and a system load, wherein the first power supplies are connected in parallel with each other and connected to the system load for outputting a load current to the system load; and
a power bank connected to the power systems and having a plurality of parallel-connected second power supplies for allowing the second power supplies to respectively output a load current when one of the power systems is overloaded, thereby allowing the power bank to output the load current as backup power to an overloaded power system;
wherein each of the first power supply and each of the second power supply respectively include an active current sharing circuit and a droop current sharing circuit, and each first power supply and the active current sharing circuit of each second power supply are configured to enter an operation mode or a shutdown mode depending on whether the load current is higher than a first current set point, and each first power supply and the droop current sharing circuit of each second power supply are configured to enter an operation mode or a shutdown mode depending on whether the load current is higher than a second current set point, thereby allowing each first power supply and each second power supply to respectively output an equal share of the load current by an active current sharing technique and/or a droop current sharing technique;
wherein when the load current is higher than the first current set point and the second current set point of each of the first power supply and the second power supply, the first power supply outputs the equal share of the load current by the droop current sharing technique and the second power supply outputs the equal share of the load current by the active current sharing technique.

18. The power system assembly according to claim 17 wherein the first current set point provided for the active current sharing circuit of the first power supply and the second current set point provided for the droop current sharing circuit of the first power supply are both set to be 0% of a rated current of the first power supply, and the first current set point provided for the active current sharing circuit of the second power supply and the second current set point provided for the droop current sharing circuit of the second power supply are both set to be 0% of a rated current of the second power supply.

19. The power system assembly according to claim 18 wherein when each first power supply has started operating and the load current is higher than the first current set point and the second current set point provided for the first power supply, the active current sharing circuit of the first power supply enters the shutdown mode and the droop current sharing circuit of the first power supply enters the operation mode, thereby allowing the first power supplies to respectively output an equal share of the load current by the droop current sharing technique.

20. The power system assembly according to claim 18 wherein when each second power supply has started operating and the load current is higher than the first current set point and the second current set point provided for the second power supply, the active current sharing circuit of the second power supply enters the operation mode and the droop current sharing circuit of the second power supply enters the shutdown mode, thereby allowing the second power supplies to respectively output an equal share of the load current by the active current sharing technique.

* * * * *